United States Patent [19]

Bravenec

[11] Patent Number: 4,471,307
[45] Date of Patent: Sep. 11, 1984

[54] AMPLITUDE MODULATED RESISTIVITY LOGGING SYSTEM

[75] Inventor: Frank R. Bravenec, Houston, Tex.

[73] Assignee: Halliburton Company, Duncan, Okla.

[21] Appl. No.: 365,064

[22] Filed: Apr. 2, 1982

[51] Int. Cl.³ .............................................. G01V 3/24
[52] U.S. Cl. .................................................. 324/373
[58] Field of Search ................................ 324/373–375, 324/366

[56] References Cited

U.S. PATENT DOCUMENTS

| | | | |
|---|---|---|---|
| 3,195,041 | 7/1965 | Mayes | 324/366 |
| 3,452,269 | 6/1969 | Welz | 324/373 |
| 3,772,589 | 11/1973 | Scholberg | 324/373 |
| 3,882,376 | 5/1975 | Schuster | 324/373 |
| 3,973,188 | 8/1976 | Attali et al. | 324/374 |
| 4,015,197 | 3/1977 | Clavier | 324/374 |
| 4,087,740 | 5/1978 | Suau | 324/373 |

*Primary Examiner*—Gerard R. Strecker
*Attorney, Agent, or Firm*—W. J. Beard

[57] ABSTRACT

In the preferred and illustrated embodiment of a downhole oil well resistivity logging tool having a focused electrode, the current ideally flows from the electrode radially outwardly in a thin sheet deep into the earth's formation adjacent to the well. There is an undesirable vertical current component along the electrodes which distorts the measurement of resistivity. First and second alternate embodiment are set forth which utilize additional balanced electrodes in the electrode array. They establish a vertical current in the adjacent formation. The vertical current is varied by means of an oscillator connected to the balanced electrodes, and the voltage of the electrodes is monitored to detect zero crossing. Zero crossing is indicative of reduced vertical current flowing in the formation. At this instant, the entire current flow from the electrode array is radially into the formation whereby measurements of the current flow and voltage of the current emitting electrode enables calculation of the formation resistivity.

11 Claims, 4 Drawing Figures

AMPLITUDE MODULATED RESISTIVITY LOGGING SYSTEM

BACKGROUND OF THE DISCLOSURE

A resistivity logging tool featuring a focused electrode is set forth in U.S. Pat. No. 3,772,589. In the operation of this device, it is desirable that current flow from the electrode array of the tool radially outwardly, penetrating deeply into the adjacent formation. The array flows current to a remote fixed current return electrode. The current flow away from the tool (suspended in the wellbore while making measurements) can be resolved into vector components. The desirable direction of current flow is radially outwardly deep into the formation. An undesirable direction of current flow is along the tool in the borehole or invaded formation, a direction perpendicular to the desired direction of current flow.

This vertical current flow is a source of error. It creates an error in obtaining the true resistivity of the undisturbed formation by measuring electrode voltage and current. Determination of the resistance of the formation through Ohm's Law obtains erroneous data if there is a vertical component in addition to the radial component.

The present invention sets forth improvements in the focused electrode resistivity logging tool to enable the measurement of resistivity to be based primarily on current flow radially outwardly away from the tool deep into the formation undergoing tests. The improved resistivity logging system set forth in the present disclosure in two embodiments incorporates additional electrodes on the resistivity logging tool to thereby create a controlled vertical current along the wellbore. This vertical current is systematically varied to reverse the current flow. By measuring the voltage and current flow between the electrodes which create the vertical current, zero crossing or nulling of the vertical current can be determined. At the instant when this occurs, all current flowing from the focused electrode system is radially into the formation, and formation resistivity can then be accurately determined by Ohm's Law.

There is a distinct advantage in utilizing this apparatus. Devices of the prior art are primarily feedback type systems. They are feedback systems including the earth's formation as an active component in the feedback loop. This imposes unusual performance requirements on the feedback system to compensate for the wide dynamic range of values of the components interposed in the feedback loop. Such feedback loops tend to be unstable; this apparatus avoids the difficulties of destabilized feedback loops.

With the foregoing in mind, the present apparatus is briefly summarized as alternate embodiments of a system for resistivity logging featuring a focused electrode system incorporating additional balanced electrode pairs creating a vertical current component flowing in the adjacent wellbore formation. This current flow is evaluated by measuring the current and voltage of the electrode pairs. A variable power supply, such as an oscillator, is connected to the additional electrode pairs. Periodically, the current passes through zero as it reverses directions which reversal is observed by a null detecting system.

BRIEF DESCRIPTION OF THE DRAWINGS

So that the manner in which the above recited features, advantages and objects of the invention, as well as others, which will become apparent, are attained and can be understood in detail, a more particular description of the invention, briefly summarized above, may be had by reference to the embodiments thereof illustrated in the appended drawings, which drawings form a part of this specification. It is to be noted, however, that the appended drawings illustrate only typical embodiments of the invention and are not to be considered limiting of its scope, for the invention may admit to other equally effective embodiments.

FIG. 4 is a set of waveforms observed at various parts of the circuitry.

DETAILED DESCRIPTION OF THE PREFERRED EMBODIMENTS

Figure 1:
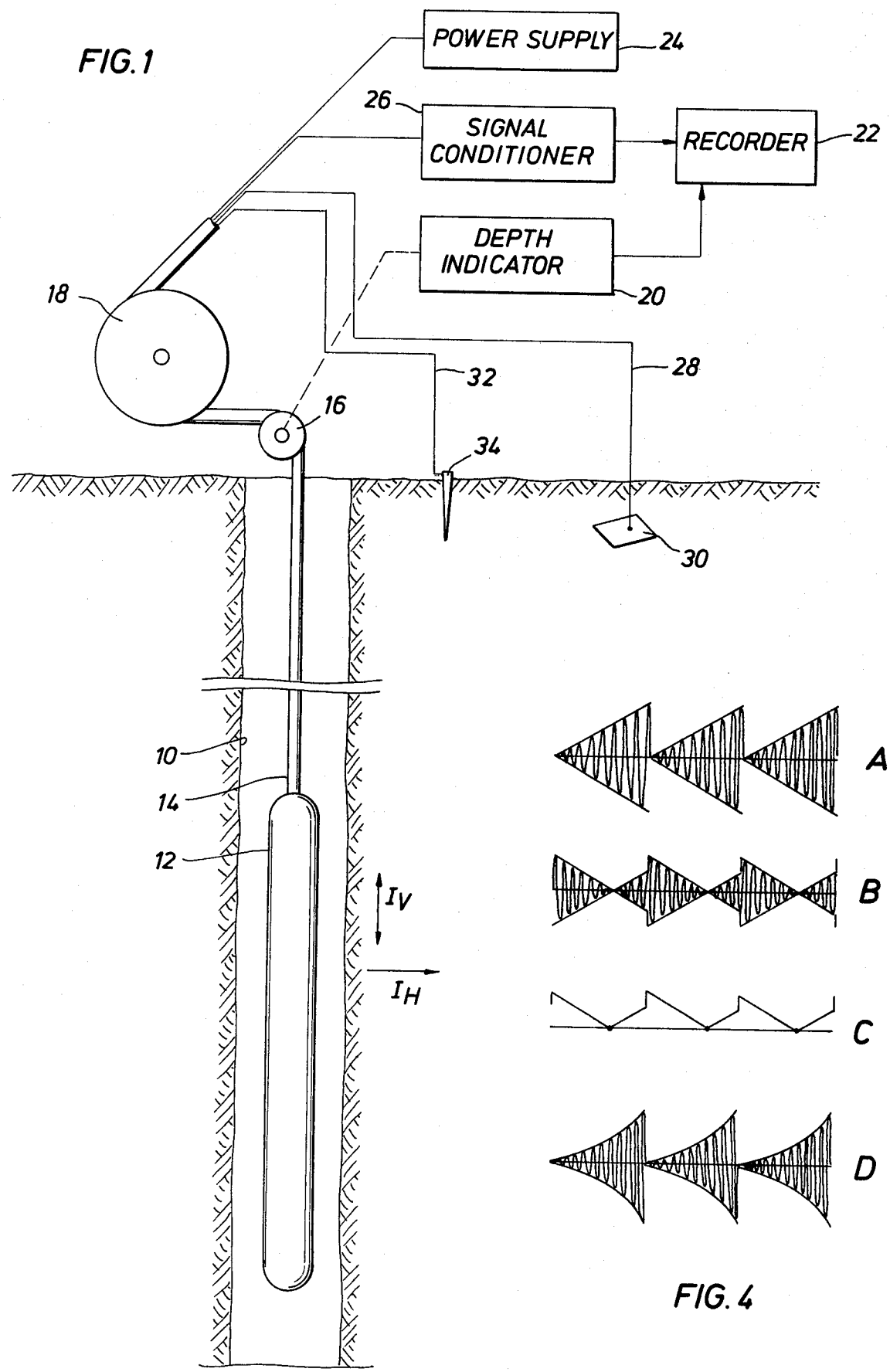
FIG. 1 shows a downhole resistivity logging tool in a wellbore and associated logging equipment for supporting the resistivity logging system in the wellbore and including surface located grounding electrodes.

Attention is first directed to FIG. 1 of the drawings. There, the numeral 10 identifies a wellbore in which a downhole oil well logging tool 12 is suspended. It is supported by a logging cable 14 having a number of conduits or conductors in it. The logging tool 12 includes a resistivity logging system in accordance with the teachings of the present invention. To this end, it has a number of electrodes on it. The deployment of these electrodes on the oil tool 12 will be described below. The oil tool 12 is typically lowered to the bottom of the well and is then raised in the wellbore 10. As it is raised, a plot of the resistivity versus depth is obtained. To this end, the logging cable 14 passes over a pulley 16. The logging cable is spooled on a large storage drum 18. The cable 14 may be as long as twenty-five thousand feet, and is at least sufficiently long to reach to the bottom of the wellbore 10. The logging cable 16 is, therefore, raised by pulling the cable over the pulley 16. The pulley 16 is rotated and thereby indicates the depth of the logging tool 12. The pulley is mechanically connected to a depth indicator 20 which is then connected to a recorder 22. The logging cable encloses, within a sheath, a number of conductors. For instance, one conductor is connected to a power supply 24. Another conductor is the output from the resistivity logging system which is connected to a signal conditioner 26. The signal conditioner forms a signal suitable for recording by the recorder 22 which is stored on a data format.

The logging cable 14 deploys several conductors. One of the conductors is a current return cable 28. It is connected to a current grounding lug or terminal 30. A voltage return cable 32 is connected to a suitable ground connection such as a spike 34. The conductors 28 and 32 provides reference points for operation of the resistivity logging system.

FIG. 1 generally sets forth the manner in which the current is distributed in the earth's formations. Current flow is from the logging tool 12. Ideally, the current flows radially outwardly from the logging tool, and penetrates deeply into the formations which surround the wellbore 10. In this idealized arrangement, the integral of the current flow provides a summation of the total current flowing to the return conductor 28. It will be appreciated that the current flow may not flow perfectly horizontal. In fact, it is fair to assume that there are two components to the current flow, the first being the desirable horizontally, radially outwardly directed component. Separate from that, there is a vertical component. The vertical component travels along the length of the tool and is perpendicular to the desired horizontal component. The vertical component is a source of error. Specifically, it creates error because the vertical component changes the measured resistivity. This undesirable error can be reduced if the vertical component of current can be eliminated. It is not possible to predict the magnitude of the vertical component. It is also not possible to predict the manner in which it varies with depth in the wellbore. Attempts have been made, in the past, to reduce the vertical component by incorporating a feedback loop, but they have been less than successful because the feedback loop tends to destabilize. The vertical component of the current is the source of destabilization for the feedback circuitry.

Figure 2:
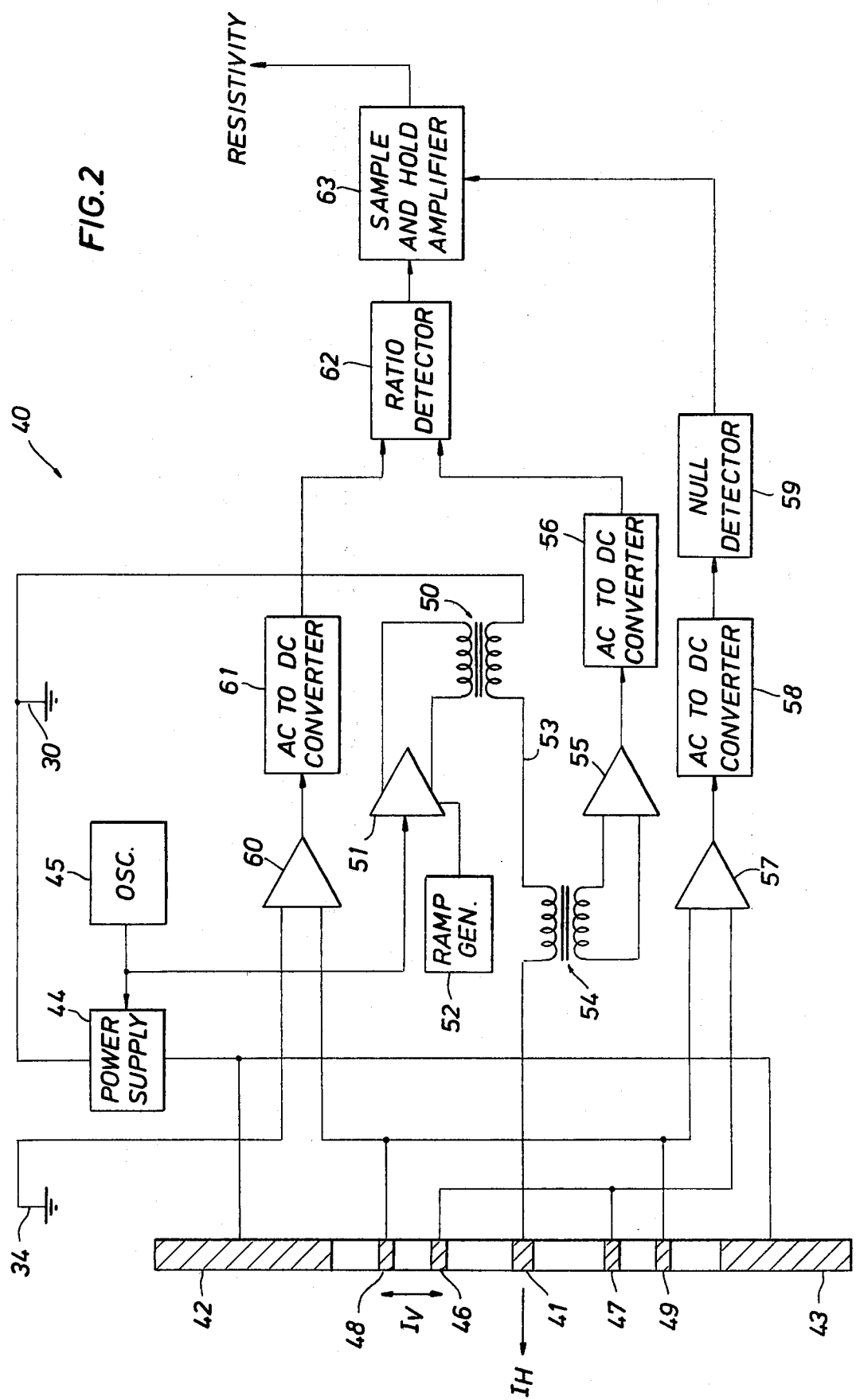
FIG. 2 discloses a first embodiment of an improved circuit and electrode array performing a resistivity measurement only when current is flowing radially outwardly into the formation and avoiding distortions by vertical current flow in the adjacent formation undergoing tests.

Attention is therefore next directed to FIG. 2 of the drawings which shows a first embodiment. The embodiment of FIG. 2 is identified at 40, and includes a set of electrodes deployed along the body of the resistivity logging tool 12. These electrodes are placed in contact with the earth's formations in the conventional manner. To this end, several electrodes are shown at the left of FIG. 2 and include a center electrode 41. The center electrode 41 is the source of the horizontal current component flowing radially outwardly. Focusing electrodes are included at 42 and 43 along the length of the tool. The electrodes 42 and 43 are connected with a power supply 44. The power supply is driven by an audio oscillator 45. The oscillator 45 is set to some arbitrary frequency such as 1,000 hertz, to modulate the output current from the power supply 44. This current is connected to both of the focusing electrodes 42 and 43 to assist in directing the current $I_H$ radially outwardly.

There are four additional electrodes which are arranged in balanced pairs and centered about the electrode 41. The closer pair includes electrodes 46 and 47 and the remote pair is identified at 48 and 49.

FIG. 1 sets forth a current ground terminal 30. That terminal is included in FIG. 2. The power supply 44 is grounded to it. In addition, the secondary of a transformer 50 is likewise grounded. The primary of the transformer 50 is connected with an amplifier 51. The amplifier 51 is provided with the oscillator signal over a suitable conductor. The amplified sine wave signal is modulated by a triangular waveform from a ramp generator 52. The ramp generator may have a logarithmic or exponential sweep as well as a linear ramp. The ramp generator modulates the AC signal and forms a ramp AC signal input to the primary of the transformer 50. This signal is amplified and applied to the electrode 41 through a conductor 53. The modulated waveform is shown at FIG. 4 and is trace A. An exponential trace is shown at trace of FIG. 4.

The conductor 53 is connected with the primary of a transformer 54. The transformer 54 has a secondary which is input to an amplifier 55. Amplifier output is connected to a converter 56 providing a DC output from an AC input. The signal from the converter 56 is proportional to the current from electrode 41.

The conductor 53 extends from the transformer 50 to the output electrode 41. The current output from the resistivity logging tool flows into the earth's formation to determine the resistivity of the formation. There is no assurance that the current will flow radially outwardly; some of the current can flow vertically and this vertical component is the source of error in the operation of the equipment.

It will be recalled that there are smaller electrodes 46-49 arranged in two pairs. The pairs are bracketed above and below the center electrode 41. The two electrode pairs are connected to inputs of a differential amplifier 57 to form an output which is, in turn, connected to a converter 58, to convert the AC input to a DC output. The converter 58 is then connected to a null detector 59 for detecting zero crossing.

FIG. 1 discloses a voltage reference in the form of ground spike 34. The ground is also shown in FIG. 2 of the drawings. It serves as one input to a differential amplifier 60. The amplifier 60 is connected to an AC to DC converter 61. The other input terminal for the differential amplifier 60 is connected to the electrode pair 48 and 49. The inputs provide a voltage differential (referenced to ground) which is input to a ratio detector circuit 62. Another input is obtained from the converter 56. This input is proportional to current. The output of the circuit 62 is a ratio determined by voltage/current, a measure of resistivity. That signal, in turn, is input to a sample and hold amplifier 63. This amplifier is triggered at specific times by the null detector 59. The signal input to the sample and hold amplifier 63 is dynamic. It is held at certain intervals for the express purpose of obtaining the time synchronized measure of resistivity. The manner in which this is achieved will be described below.

The end located electrodes 42 and 43 have a sine wave applied to them. This is basically a sine wave of fixed amplitude. In synchronization with that sine wave, a sine wave is also applied to the center electrode 41. However, it is ramped with a modulating signal, and the amplitude is, therefore, increased from some value, typically near zero, to the maximum value permitted. This ramped signal increases, and is the signal which initiates current flow. Recalling that the current flow has vector components, one desirable and the other undesirable, a certain portion of that signal is presumably in the desirable direction, but this is an assumption which is not safely made.

The intermediate electrodes 46-49 are between the end electrodes which have a fixed amplitude and the central electrode 41 which has a sweep amplitude. Under the assumption that there is a vertical component of current flow, that current flow can either be upwardly or downwardly. In either case, such a current flow will create a potential difference across either the upper or lower pair of electrodes. The polarity of the difference is not important. The potential difference is applied to the amplifier 57 (see FIG. 4, Trace B) and forms an output at the converter 58. The converter output signal is a triangular waveform shown at trace C in FIG. 4. However, the formation current flow, giving rise to the signals sensed at the amplifier 57, is modulated by the ramp signal applied to the central electrode 41. So to speak, the pairs of electrodes sense two superimposed signals. One is generated by the ramp modulated current flow in the formation along the tool. The other signal is from the vertical current from the central electrode 41. This component is the current that flows from the central electrode in a vertical direction which, here, is assumed to be a nonzero value. At some point during the ramp cycle, these two currents null to zero. That is, the current flow in a vertical direction, is offset by the intentionally created vertical current flow measured at the electrode pairs 46–49. This null is recognized by the null detector 59. Such a null is shown in Trace C of FIG. 4. Beginning with a ramp modulation from the generator 52 interposed on the current injected into the formation from the central electrode 41, a similar wave shape appears at the null detector. However, it is offset, shifted upwardly or downwardly as the case may be, so that is accomplishes a zero crossing or null at some point during its cycle. Compare the timeshift in Traces A and C of FIG. 4. With this offset, zero crossing occurs at a midportion of the ramp cycle and the null detector forms a signal when the null occurs, and this signal is supplied to the sample and hold amplifier 63. The inputs to the ratio detector 62 include voltage and current. These two signals (through Ohm's Law) define the resistance interposed by the formation to the central electrode 41, thereby triggering the device into operation of form a measure of resistivity output from the sample and hold amplifier. This signal is the signal of interest, namely a measure of resistivity without vertically flowing current components. It is indicative that the current has flowed horizontally in a sheet radially outwardly from the central electrode 41 whereby the integral of this current flow includes no vertical component.

Assume that the oscillator 45 operates at a frequency of 1,000 hertz; assume further that the ramp generator forms twenty ramps per second, thereby yielding twenty data points per second. In this event, the null detector will locate the twenty zero crossing occurrences and signal the sample and hold amplifier 63 to operate on the requisite twenty occasions. In the example given, it is assumed that the modulation applied by the ramp generator 52 to the sine wave is one hundred percent modulation which is reflected at the current flow from the central elctrode 41.

Figure 3:
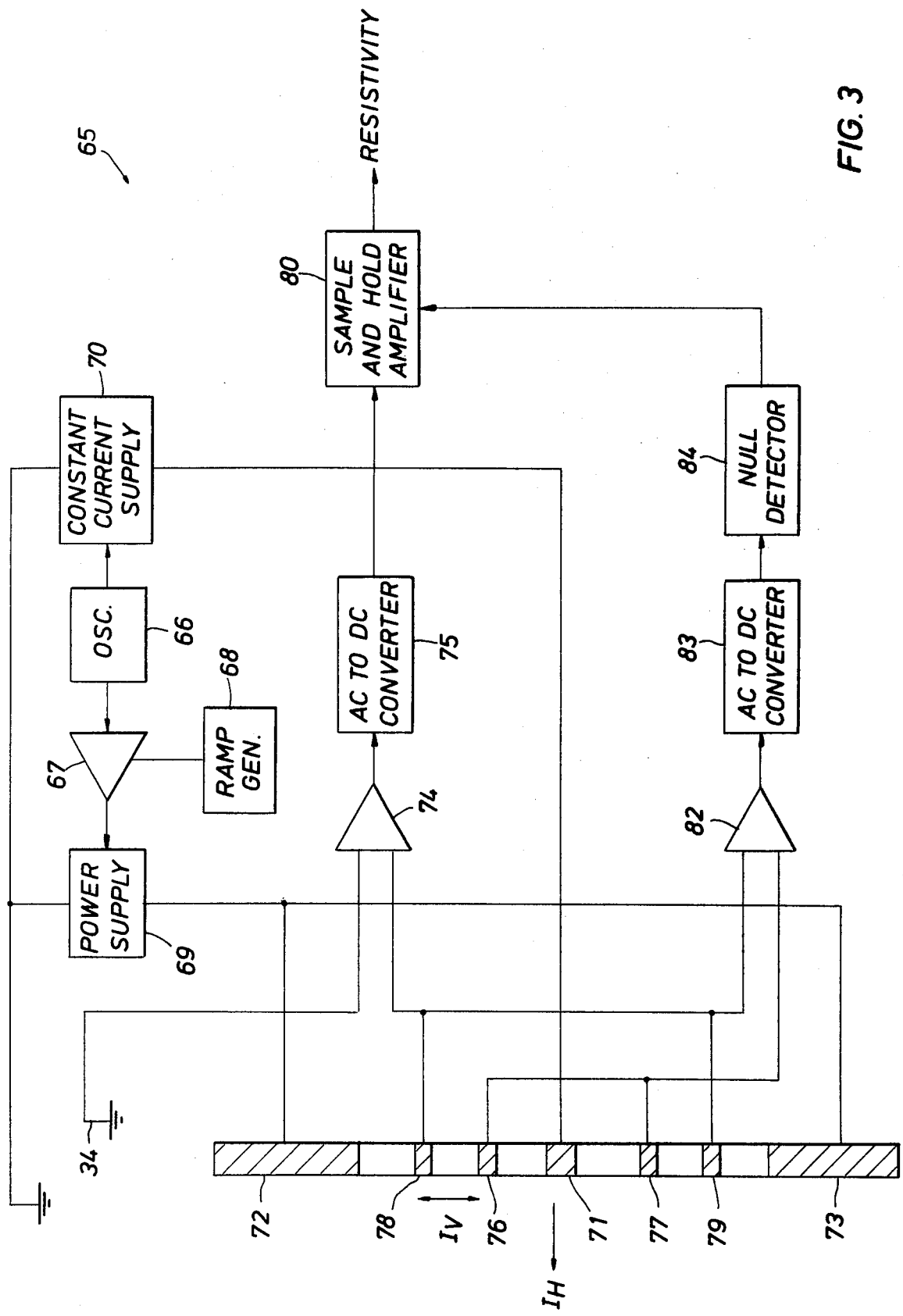
FIG. 3 discloses an alternate embodiment reducing vertical current flow in the formation to obtain an accurate measure of resistivity.

Attention is next directed to FIG. 3 of the drawings which shows an alternate form of the present invention. This apparatus is indicated generally by the numeral 65. This system utilizes an oscillator 66 input to an amplifier 67. This signal is modulated by a triangular waveform from a ramp generator 68. Again, an alternative is exponential modulation exemplified at Trace D of FIG. 4. It is increased from small current levels to large current levels by applying the signal to a power supply 69. The central electrode is powered by a constant current power supply 70.

The electrodes deployed in FIG. 3 are similar to those in FIG. 2. To this end, there is a central electrode 71. In addition, it is surrounded by end located electrodes 72 and 73 which assist in focusing the current flow radially outwardly into the formation. They are driven in parallel in the same manner as shown in FIG. 2. The central electrode is driven by the constant current power supply 70 while the end electrodes focus the current flow through the use of the modulated one kilohertz signal applied to them.

The detection equipment shown in FIG. 3 includes a differential amplifier 74. This differential amplifier is connected to the ground electrode 34. The electrode 34 shown in FIG. 1 is incorporated in the system as a voltage reference. The differential amplifier is output to an AC to DC converter 75 to demodulate the time delayed trace exemplified at FIG. 4, Trace B. The variable input signal is obtained from the connected electrode pairs. The electrode array incorporates first and second electrodes 76 and 77. Another electrode pair includes electrodes 78 and 79. The two pair are arranged symetrically above and below the center electrode 71. The differential amplifier 74 is connected to the outer electrode pair 78 and 79.

The system is constructed with a constant current power supply 70 and the current flow from the central electrode 71 is, therefore, constant. Because it is fixed, it is not necessary to measure any value proportionate to it. The resistivity of the earth's formation is, therefore, indicated directly proportional to output voltage. The amplifier 74 output is, therefore, converted at the converter 75 into a DC level and this is output to a sample and hold amplifier 80. This voltage represents resistivity. Again, this voltage may be in error because there is a vertical current component in the earth's formation. The sample and hold amplifier is triggered in timely fashion to null this error to zero. This is accomplished by inputting voltages from the electrode pairs 76–79 to a differential amplifier 82. It forms a potential difference at the AC to DC converter 83. The DC signal is then applied to a null detector 84 and zero crossing is sensed by it. Zero crossing is shown at Trace C of FIG. 4. When zero crossing occurs, a signal is formed and applied to the sample and hold amplifier 80, and it is operated in timely fashion to respond to a nulled vertical current.

Operation of this device should be considered. Assume that a vertical current component does flow in the formation. The electrode pairs deployed just above and below the central electrode 71 will form voltages dependent on this current. If the vertical current is nil, no voltage difference is formed. However, if it does occur, a voltage will be observed and the differential voltage applied to the amplifier 82 will be amplified. When this voltage drops to zero, zero crossing has been indicated which will be detected by the null detector 84.

The system of FIG. 3 differs from the system of FIG. 2 in the deployment of the current sources. In FIG. 2, the central electrode is driven with a triangular modulated waveform (Trace A of FIG. 4) output into the earth's formation. In the embodiment 65, the current is fixed. Rather, the triangular modulated since wave is applied to the focusing electrodes 72 and 73. Current flow into the formation is again directed outwardly radially and is returned to the remote current electrode shown in FIG. 1. The system of FIG. 3 is somewhat more economical in components, namely as a result of the use of a constant current power supply. Because a constant current is involved, there is no need to obtain a ratio based on current measurements.

It is desirable to conduct the resistivity signal from the tool 12 along the logging cable 14 to the surface to be recorded. To this end, the resistivity signal is supplied to the signal conditioner 26 and recorded by the recorder 22 as a function of depth.

While the foregoing is directed to the preferred embodiment, the scope thereof is determined by the claims which follow.

I claim:

1. A downhole resistivity logging system incorporating focused electrode means for directing a current flow from the resistivity logging system radially outwardly into the earth's formation, the apparatus comprising:
   (a) focused electrode means for flowing a current into the earth's formation adjacent to said focused electrode means;
   (b) means for measuring signals from said focused electrode means and forming an output signal indicative to resistivity of the earth's formation;
   (c) means for forming a current flow in the earth's formation having a vertical component thereof;
   (d) means for altering the current flow such that the vertical component is swept between first and second values;
   (e) voltage responsive electrode means deployed along said resistivity logging system for detecting voltage differentials indicative of vertical current flow in the earth's formation;
   (f) null detecting means connected to said voltage responsive electrode means for determining a null in said voltage; and
   (g) output means operated by the null detected by said null detecting means for identifying the output signal indicative of resistivity at the instant of said null.

2. A resistivity well logging system having an elongated body member sized and adapted for passage through a well borehole penetrating earth formations for measuring the resistivity of the earth formations comprising:
   a central current emitting electrode on said body member and a pair of focussing electrodes longitudinally equidistantly spaced on said body member on either side of said current emitting electrode for directing a current flow from said current emitting electrode into the earth formations, said current having a radial component and a vertical component;
   means for supplying a constant amplitude low frequency AC power signal to said focussing electrodes;
   means for supplying an amplitude modulated low frequency AC power signal to said current emitting electrode in phase with said AC signal supplied to said focussing electrodes, the peak amplitude of said modulated signal being greater than that of said constant amplitude signal supplied to said focussing electrodes;
   means for sampling the instantaneous magnitude of the current supplied to said current emitting electrode and for generating a signal representative thereof;
   means for sensing the instantaneous potential difference between a reference ground electrode and said current emitting electrode and for generating a signal representative thereof;
   means for detecting the magnitude of said vertical component of said emitted current and for generating a null signal when said vertical component of said emitted current is equal to zero; and
   means responsive to said null signal, said current signal and said voltage signal for supplying an output signal representative of the resistivity of the earth formations.

3. The apparatus of claim 2 wherein said means for sampling the instanteous potential difference comprises voltage measuring electrode pairs longitudinally equidistantly spaced on said body member on either side of said current emitting electrode and spaced closer to said current emitting electrode than said focussing electrodes.

4. The apparatus of claim 3 wherein said means for detecting the magnitude of said vertical component of said emitted current comprises said measuring electrode pairs and means for detecting zero crossings of said vertical current component.

5. The apparatus of claim 4 wherein said means for supplying an output signal representative of the resistivity of the earth formations includes a ratio detector and a sample and hold amplifier.

6. The apparatus of claim 5 and further including means for recording said resistivity representative output signal as a function of wellbore depth of said body member.

7. A resistivity well logging system having an elongated body member sized and adapted for passage through a well borehole penetrating earth formations for measuring the resistivity of the earth formations, comprising:
   a central current emitting electrode on said body member and a pair of focussing electrodes longitudinally equidistantly spaced on said body member on either side of said current emitting electrode for directing a current flow from said current emitting electrode into the earth formations, said current having a radial component and a vertical component;
   means for supplying a constant current low frequency AC power signal to said current emitting electrode;
   means for supplying an amplitude modulated low frequency AC power signal to said focussing electrodes in phase with said constant current AC signal supplied to said current emitting electrode, the peak amplitude of said modulated signal being greater than that of said constant current signal supplied to said current emitting electrode;
   means for detecting the magnitude of said vertical component of said emitted current and for generating a null signal when said vertical emitted current component is equal to zero;
   means for sensing the instantaneous potential difference between a ground reference electrode and said current emitting electrode and for generating a signal representative thereof; and
   means responsive to said null signal and said current emitting electrode voltage representative signal for supplying an output signal representative of the resistivity of the earth formations.

8. The apparatus of claim 7 wherein said means for sampling the instantaneous potential difference comprises voltage measuring electrode pairs longitudinally equidistantly spaced on said body member on either side of said current emitting electrode and spaced closer to said current emitting electrode than said focussing electrodes.

9. The apparatus of claim 8 wherein said means for detecting the magnitude of said vertical component of said emitted current comprises said measuring electrode pairs and means for detecting zero crossings of said vertical current component.

10. The apparatus of claim 9 wherein said means for supplying an output signal representative of the resistivity of the earth formations includes a sample and hold amplifier.

11. The apparatus of claim 10 and further including means for recording said resistivity representative output signal as a function of wellbore depth of said body member.

* * * * *